Jan. 16, 1934.  N. SKILLMAN  1,943,631
METHOD OF FORMING A CONNECTING UNIT FOR SHOCK ABSORBERS AND THE LIKE
Original Filed July 5, 1929
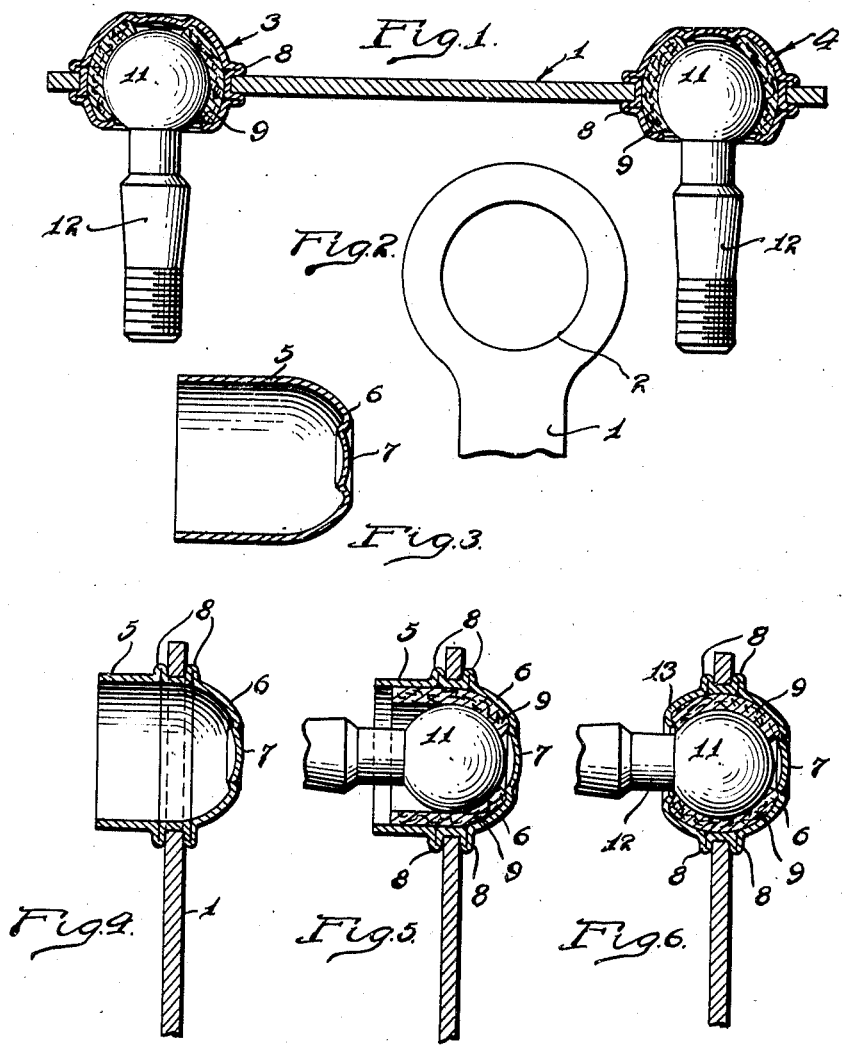
INVENTOR.
NEWTON SKILLMAN.
BY
Barnes & Kisselle
ATTORNEYS Patented Jan. 16, 1934

1,943,631

UNITED STATES PATENT OFFICE 1,943,631

METHOD OF FORMING A CONNECTING UNIT FOR SHOCK ABSORBERS AND THE LIKE

Newton Skillman, Detroit, Mich., assignor to O. & S. Bearing Company, Detroit, Mich., a corporation of Michigan Original application July 5, 1929, Serial No. 376,057. Divided and this application October 31, 1931. Serial No. 572,339

16 Claims. (Cl. 29—149.5)

This invention relates to a method of forming a connecting unit for shock absorbers and the like, and has to do particularly with an extremely simple, durable and permanent assembly unit for connecting spaced operating units. The present invention is a division of application Serial No. 376,057, filed July 5, 1929.

In the design and fabrication of connecting assemblies for spaced operating units many different units have been designed which, while more or less efficient, have usually been complicated and expensive both in design and in structure. Such prior connecting units are well illustrated by the disclosures in the patents to Hassler 1,508,097, September 9, 1924 and Garman 1,458,331, June 12, 1923.

It is the purpose of the present invention to provide a connecting or assembly unit which when once assembled, forms an integral locked permanent assembly. More specifically, the connecting unit consists of spaced self-lubricating bearing members which are formed integrally and which enclose ball joints in a permanent locked relation whereby when the unit is once installed, it becomes a permanent, non-adjustable part of the automobile or other mechanism whereby to provide a permanent, fool proof unit at a point which has heretofore been the source of much trouble.

Other features of the present invention reside in the novel manner of fabricating and assembling the unit, as will be more clearly brought out in the specification and claims.

In the drawing:

Fig. 1 is a longitudinal sectional view of a typical unit assembly as applied to a shock absorber design.

Fig. 2 is an enlarged fragmentary view of a preferred form of one end of the link.

Fig. 3 is a sectional view of the preferred form of bearing member prior to being deformed to form the final bearing.

Fig. 4 illustrates the first step in forming the rigid bearing member at the end of the link.

Fig. 5 illustrates the second step wherein the lubricant impregnated fibrous material is inserted into place and preformed and compressed to approximately the right size.

Fig. 6 illustrates the next step of closing in the bearing member around the ball joint whereby to complete the spherical surface of the lubricant impregnated fibrous material and lock the ball joint permanently into position.

The present invention relates primarily to a connecting unit which connects spaced operating members which must have more or less universal movement with respect to each other during normal operation of the device. It is particularly adaptable to shock absorber assemblies but it will be obvious that it is equally well useful in connection with drag links and other similar structures requiring a connecting link assembly.

Two novel features stand out particularly in the present invention. The first feature resides in the rigid, or what may be termed integral, formation of the complete unit so as to form a permanent locked assembly. The other feature resides in the design and expansibility of the bushing material.

The invention may be best described by the method of forming the same, and in Fig. 6 I have illustrated the method of forming the invention as embodied in connection with shock absorber design.

The connecting link such as will be used in connection with a shock absorber may be generally designated 1 and such link may be provided with spaced apertures 2 in accordance with the assembly. This link is preferably formed of flat cold rolled steel or the like and is preferably twisted whereby the one bearing member is positioned at a 90° angle to the other. However, in some installations the bearing units will of necessity be parallel and in such cases it will be understood that the link may be reinforced or embossed longitudinally whereby to add strength.

The bearings for each end of link 1 may be generally designated 3 and 4 and the outer shell of each bearing member is preferably formed by providing a substantially cylindrical member 5 which is preferably cup shaped as at 6 to give the bushing the proper spherical shape as will be later described. This outer shell or bearing member is also preferably provided with a slight indentation 7 whereby to reduce the amount of bushing material required and to position or locate the same.

The bearing member 5 is next positioned within the aperture 2 of the link and placed in suitable dies whereby the bearing is subjected to end pressure sufficient to distort the cylindrical part of the bearing and to form the angular ridges 8 whereby to rigidly lock the bearing shell in position in the aperture of the link.

A strip of lubricant impregnated fibrous material 9 may then be inserted in the bearing member and subjected to suitable pressure whereby to compress the same and give the interior walls thereof the desired shape. In other words, the interior walls of the lubricant impregnated fibrous bushing adjacent the spherical portion 6 of the bearings are preformed to actual working shape while the outer part of the bearing, as at 10, is left substantially cylindrical to be later closed. It will be understood that this bushing 9 may be formed in different ways, outside the bearing member or after it is placed within the bearing member, the point being that it is preformed in shape and preferably compressed.

The next step consists in closing the ball joint 11 in position as shown in Fig. 6. Each ball joint 11 may form an integral part, or may be locked to, suitable studs 12. After being positioned so as to contact with the spherical surface of the bushing member 9, the unit is placed in suitable dies and the cylindrical portion 5 of the outer bearing shell is pressed and deformed as at 13 whereby to complete the spherical shape of the outer bearing and to close in and complete the spherical shape of the bushing 9. This closing in or deforming of the cylindrical part of the bearing is a very important step as it not only positively and permanently locks the ball joint into position but also finally shapes the bushing member and gives the entire bushing 9 additional compression.

It will thus be seen that I have provided a simple connecting link for shock absorbers and the like wherein the connecting unit itself is rigid, integral, and permanent, and wherein all parts are securely locked together and the bushing is compressed so that it will not only provide a self-lubricating bearing but will gradually expand after continued wear to always securely grip the ball joint to provide a non-adjustable self-lubricating joint.

Although it will be obvious that the inner portion of the fibrous material 9 may be initially preformed and compressed into semi-spherical shape by many different means, I prefer to preform and compress this inner portion of the fibrous material by the ball member 11, as shown in Fig. 5. In other words, I prefer to eliminate the usual preforming and compressing or sizing operation by inserting the ball member 11 itself in place, thus after the strip of fibrous material is placed in position the next step would be the insertion of the ball member, under suitable pressure whereby to preform and compress the inner portion of the fibrous material after which the cylindrical portion 5 may be closed in as shown in Fig. 6.

In defining the strip of fibrous material 9 as a "bushing", in the specification and claims, it will be understood that I am referring broadly to a compressible expansible packing or material, located between the outer and inner bearing members, for asisting in positioning and locking the ball joint in place as distinguished from a mere bearing surface for the ball joint.

What I claim is:

1. The method of forming bearings in an integral connecting unit for shock absorbers and the like, which comprises forming a link with spaced apertures, inserting in each aperture a bearing shell having a portion of its surfaces semi-spherical in shape and a portion cylindrical, the semi-spherical portion being closed in, deforming the walls of the bearing member to lock the same in position, inserting a cylindrical lubricant impregnated bushing inside the bearing member, inserting a ball joint within each bearing member and then deforming the cylindrical portion of each bearing member whereby to close the same in around the ball joint to form a substantially spherical bushing and a substantially spherical outer bearing shell.

2. The steps in the method of forming bearings in connecting units for shock absorbers and the like which consists in forming suitable spaced apertures in a link, forming an outer bearing shell having a closed end semi-spherical in shape and an open end of substantially cylindrical shape, inserting said shell in one of said apertures, positioning a substantially spherical bearing member within said shell, deforming said shell to lock the same in said link and closing in the outer substantially cylindrical end thereof, whereby to form a substantially spherical bearing shell around said bearing member.

3. The steps in the forming of bearings in an integral connecting link for shock absorbers and the like, which consists in forming spaced apertures in a connecting link, fabricating a shell member for said apertures having a closed end, and a substantially cylindrical open end, positioning said shell member in said aperture, positioning a lubricant impregnated fibrous material within said shell member, positioning a ball joint within said fibrous bushing and then deforming the walls of said shell member whereby to lock the same to the link, to form an outer shell of a substantially spherical shape, to press and form the fibrous bushing in a substantially spherical shape and permanently lock the ball joint into position.

4. The method of forming bearings in an integral connecting unit for spaced operating members having a substantially spherical bearing member, which consists in forming spaced apertures in the link corresponding to said operating members, positioning therein a bearing shell having a closed end with surfaces substantially spherical in shape and an open end substantially cylindrical in shape, deforming walls of said outer bearing member to lock the same in position within one of the said apertures, the inner walls of said bearing member being provided with a preformed lubricant impregnated fibrous bushing having an inner contour simulating the contour of the outer bearing member, positioning said substantially spherical bearing member in said bushing and then deforming the substantially cylindrical portion of said outer bearing member to form a substantially spherical bushing and outer member to lock the spherical bearing member permanently into position.

5. The method of forming bearings in an integral connecting unit for spaced operating members having substantially spherical bearing members which consists in forming spaced apertures in the link corresponding to said operating members, positioning therein a bearing shell having a substantially spherical closed end and a substantially cylindrical open end deforming walls of said outer bearing member to lock the same in position within one of the said apertures, the inner walls of said bearing member being provided with a preformed lubricant impregnated fibrous bushing having an inner contour simulating the contour of the outer bearing member, positioning said substantially spherical bearing member in said bushing and then deforming the substantially cylindrical portion of said outer bearing member to form a substantially spherical bushing and outer member to lock the spherical bearing member permanently into position, the deforming of said cylindrical portion of the outer bearing member being sufficient to place the fibrous bushing under pressure whereby it acts expansively against said spherical bearing member.

6. The method of forming bearings in a permanent non-adjustable connecting unit for shock absorbers and the like, which comprises integrally forming a link and spaced bearing housings, a portion of each housing being substantially hemi-spherical in shape and a portion being open, inserting lubricant impregnated fibrous bushing material and a ball member in each housing, and then distorting the open portion of each housing to compress the bushing material against the ball member whereby to position and permanently lock the ball members in place.

7. The method of forming bearings in a permanent non-adjustable connecting unit for shock absorbers and the like, which comprises integrally forming a connecting link and outer bearing housing, a portion of one end of said housing being inwardly hemispherical in shape and the other end open, inserting a bushing of compressible fibrous material and ball member in said housing, and then closing in the open end of said housing to compress the bushing material between the ball member and the housing whereby said bushing material acts expansively against said ball member and positions and permanently locks the ball member in place.

8. The method of forming self-aligning bearings, which comprises inserting a bushing of compressible material within an outer bearing having a portion of its length substantially cylindrical in shape and a portion substantially hemispherical in shape, inserting a substantially spherical inner bearing member within said bushing, compressing said bushing between the substantially spherical surface of the outer bearing member and the inner bearing member, and then distorting a portion of the cylindrical wall of said outer member to lock the bushing in place and hold the same in compressed condition, said compressed bushing positively locating and positioning the inner bearing member and acting expansively against the inner bearing member and the outer bearing member.

9. The method of forming self-aligning bearings, which comprises inserting a bushing of compressible material within an outer bearing shell having a substantially closed end and an open end, inserting an inner bearing unit having a surface of longitudinally varying contour into the open end of said shell, placing the material adjacent the substantially closed end of the shell under compression by the insertion of said inner bearing member, and then compressing the material adjacent the open end of the shell around the outer portion of the inner bearing unit to lock the inner bearing unit in position and maintain said material under compression.

10. A method of forming self-aligning bearings, which comprises inserting a bushing of compressible material within an outer bearing shell having a closed end and an open end, inserting an inner bearing unit having a surface of longitudinally varying contour into the open end of said shell, placing the material adjacent the closed end of the shell under compression by the insertion of said inner bearing member, and then compressing the material adjacent the open end of the shell around the outer portion of the inner bearing unit and distorting the open end of said shell to maintain said material under compression and lock the inner bearing unit in position.

11. The method of forming self-aligning bearings, which comprises inserting a bushing of compressible material within an outer bearing shell having a portion of its length arcuate in shape, inserting a substantially spherical inner bearing member within said outer bearing shell, placing a portion of said material under compression by the insertion of said inner bearing member and then compressing another portion of said material and distorting another portion of said outer bearing shell to lock the inner bearing member in position and maintain said material under compression.

12. The method of forming self-aligning bearings, which comprises inserting a bushing of compressible material within an outer bearing shell having a portion of its length arcuate in shape, inserting a substantially spherical inner bearing member within said outer bearing shell, placing a portion of said material under compression by the insertion of said inner bearing member and then distorting another portion of said outer bearing shell to substantially enclose the spherical surface of the inner bearing member and lock the same in position, and maintain said material under compression.

13. The method of forming self-aligning bearings which comprises inserting a bushing of compressible material within an outer bearing shell having the inner surface at one end thereof of arcuate contour, and one end substantially cylindrical in shape, inserting a substantially spherical inner bearing member with a connecting stud into said bearing shell, compressing the material against the arcuate shaped end of the outer bearing shell by the insertion of the inner bearing unit, and then compressing the portion of material around the inner bearing member adjacent the projecting stud to lock the inner bearing member in position, said material acting expansively against the inner surface of the outer bearing shell and the outer surface of the inner bearing member.

14. The method of forming a permanent, non-adjustable universal joint, which comprises forming an outer housing with an inwardly converging contour at one end, inserting a lining of lubricant impregnated compressible and expansible material within said housing, inserting a ball joint within the housing and compressing and preforming a part of said material by relative movement between the ball joint and the housing, and then closing in and compressing another portion of the fibrous material and closing in a portion of the housing to maintain said material under compression and lock said ball joint in position.

15. The method of forming a permanent, non-adjustable universal joint, which consists in forming an outer housing with a substantially hemi-spherical closed end, inserting a lining of lubricant impregnated fibrous material within said housing and then inserting a ball joint to compress and preform at least a part of said fibrous material by relative movement between said ball joint and housing, and then closing in and compressing another portion of the fibrous material and deforming a portion of the housing to maintain said material under compression and lock said ball joint in position, the compressing of the second portion of material serving to form the inner surface of said material into semi-spherical shape around the ball joint.

16. The method of forming self-aligning bearings, which comprises inserting a bushing of compressible material within an open ended outer bearing shell, inserting an inner bearing unit having a surface of longitudinally varying contour within said outer shell, placing a portion of said material under compression by relative movement between said inner bearing unit and outer shell, placing a portion of the bushing adjacent the open end of the outer shell under compression and distorting a portion of the open end of the outer bearing shell to hold said material under compression and lock the inner bearing member in position.

NEWTON SKILLMAN.